Nov. 29, 1966 B. BIRKENES 3,289,087
IMAGE REJECTION CIRCUIT
Original Filed March 24, 1959
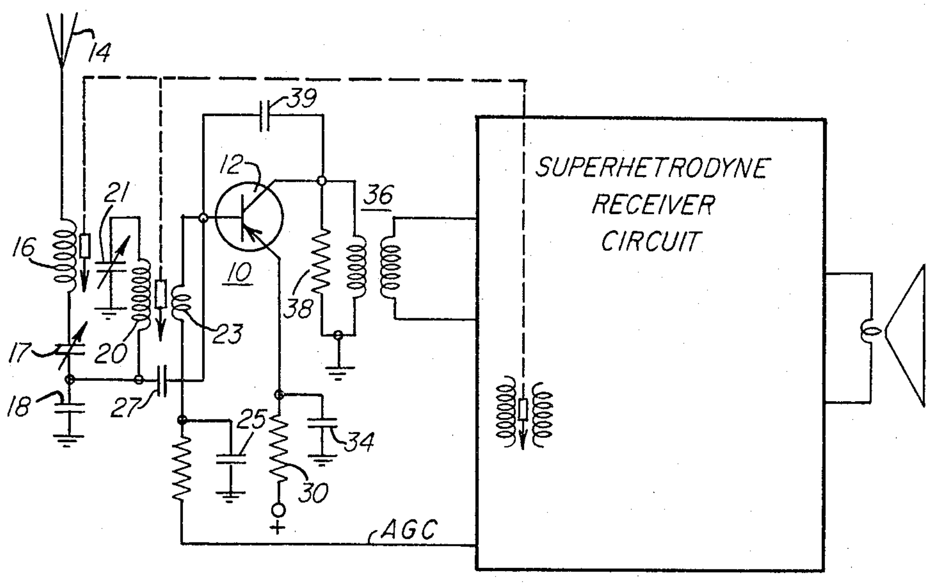
INVENTOR
Bernhard Birkenes
BY Mueller & Aichele
Attys United States Patent Office 3,289,087 Patented Nov. 29, 1966

3,289,087
IMAGE REJECTION CIRCUIT
Bernhard Birkenes, Chicago, Ill., assignor to Motorola, Inc., Chicago, Ill., a corporation of Illinois
Original application Mar. 24, 1959, Ser. No. 801,553, now Patent No. 3,089,087, dated May 7, 1963. Divided and this application Feb. 7, 1963, Ser. No. 266,121
2 Claims. (Cl. 325—388)

This is a division of my co-pending application, Ser. No. 801,553, filed Mar. 24, 1959, now Patent No. 3,089,-087.

This invention relates to an image rejection network for a radio receiver.

It is an object hereof to reduce the spurious signal response of a transistor radio receiver.

A feature of the invention is a provision of a tuned antenna input circuit and image rejection trap through which radio frequency signals may be applied to the first stage of a transistor radio receiver.

In a particular form of the invention radio frequency signals are coupled from the antenna through an input network to a stage of amplification. The input network comprises a pair of resonant circuits, one being tuned to the desired frequency and the other being tuned to the image frequency of the superhetrodyne circuit of the radio receiver. A first series connected inductor-capacitor combination is coupled in parallel with an input capacitor which input capacitor is coupled to the antenna, thereby forming a tuned circuit for the desired frequency. A second series connected inductor-capacitor combination, with the input capacitor coupled in parallel therewith, provide the image frequency rejection circuit. The two inductors are closely coupled and poled so that any image signals present are cancelled. One of the inductors is coupled to the amplifier device of the stage.

A more complete understanding of the details may be had by reference to the drawing which is a schematic diagram of a part of a superhetrodyne radio receiver incorporating the invention.

In the drawing the receiver shown is one adapted for use in an automobile and for operation directly from a normal 12 volt battery and generator. The receiver includes a radio frequency amplifier stage 10 having a transistor 12. A tuned network for selecting a desired signal is connected between the base of transistor 12 and the antenna 14. This network includes a slug tunable inductor 16 connected to the antenna 14 and capacitors 17 and 18 series connected between the inductor 16 and ground. Inductor 20 is coupled between the junction of capacitors 17, 18 and the capacitor 21 which is connected to ground. Inductor 23 is closely coupled to inductor 20 and is connected between the base of transistor 12 and ground through the bypass capacitor 25. Inductors 20, 23 are also slug tuned. Capacitors 17 and 21 are variable for alignment.

This input network forms a double tuned circuit with inductor 16 and capacitors 17 and 18 parallel tuned to the input signal. Capacitor 18 also provides coupling to a second tuned circuit comprising capacitor 18, inductor 20 and capacitor 21 which are also tuned to the signal. The signal is then inductively coupled to winding 23 and applied to the transistor 12. This network thus provides a desirable impedance match to the antenna 14 by means of a parallel resonant circuit and further provides a desirable low impedance match for the input electrode of transistor 12.

The input network further forms an image rejection trap. The image frequency in a superheterodyne receiver of the type being described will be spaced from the frequency to which the local oscillator is tuned by an amount equal to the intermediate frequency of the receiver. For example, if the local oscillator is tuned above the desired signal, the image would be at a frequency equal to twice the intermediate frequency plus the desired signal frequency. Inductor 23 together with capacitor 18 and capacitor 27, which latter capacitor is connected between the base electrode of transistor 12 and junction of capacitors 17, 18, are tuned to the image frequency. Thus, there is a tendency for the image signal to be developed across the inductor 23. However, the image signal is also developed across inductor 20 and this is coupled into inductor 23 with an opposing phase so as to minimize the image signal which tends to be developed in inductor 23.

It should also be noted that tuning of the inductors 20, 23 will effect tuning of the image rejection trap so that the input network to the receiver provides double tuning of the desired signal, rejection of the image frequency, and impedance matching of the antenna to the transistor 12.

Amplifier stage 10 also includes an emitter stabilizing resistor 30 connected between the emitter electrode and potential supply lead 32. The emitter electrode is bypassed for signals by means of capacitor 34. The output of the stage 10 is derived in a transformer 36 having a primary winding which is connected between ground and the collector of transistor 12. This winding is shunted by means of a resistor 38. A neutralizing capacitor 39 is also connected between the collector and base electrodes of the transistor.

In a receiver of practical construction operating in accordance with the teachings of the invention, component parts were as follows:

| | |
|---|---|
| Transistor **12** | 2N247. |
| Capacitor **18** | 100 mmfd. |
| Capacitor **25** | .1 mfd. |
| Capacitor **27** | .002 mfd. |

The above described receiver comprises an improved circuit which is suitable for use in portable or mobile applications. The desired circuitry for reducing spurious response is especially effective for such uses.

I claim:

1. A wave signal receiver of the superheterodyne type having an antenna input network coupled to a stage for translating a received signal, which stage includes a transistor having a base element, said network being adapted to be double tuned to a received signal and comprising a first inductor series coupled with first capacitor means and a second inductor series coupled with a second capacitor across said first capacitor means, said network further having a network series tunable to the image of the received signal including a third capacitor and a third inductor series coupled across said first capacitor means, said second and third inductors being tightly coupled inductively to cancel image signals in said third inductor and said third inductor providing an impedance match for said base element, means for simultaneously adjusting the tuning of said first, second and third inductors, means direct current coupling said base element to said third inductor, and means for applying a bias potential for said base element to said third inductor.

2. A wave signal receiver of a superhetrodyne type having an antenna input network coupled in a stage for translating a received signal, said stage including an amplifier transistor, said network comprising a first inductor series coupled with first capacitor means, a second inductor series coupled with a second capacitor across at least a portion of said first capacitor means, said network having a further circuit tunable to the image of the received signal including a third capacitor and a third inductor series coupled across a portion of said first capacitor means, said second and third inductors being inductively coupled to cancel image signals therebetween, means connecting said transistor to said third inductor to apply signals to said transistor, and means for adjusting the tuning of said first, second and third inductors.

No references cited.

KATHLEEN H. CLAFFY, *Primary Examiner.*

R. S. BELL, *Assistant Examiner.*